INVENTORS
W. W. HANSEN
J. R. WOODYARD
BY Paul B. Hunter
ATTORNEY

INVENTORS
W. W. HANSEN
J. R. WOODYARD
BY Paul B. Hunter
ATTORNEY

Patented Aug. 22, 1950 2,519,369

UNITED STATES PATENT OFFICE 2,519,369

MEANS FOR CONTROLLING RECEIVER HETERODYNE FREQUENCY BY TRANSMITTER

William W. Hansen and John R. Woodyard, Garden City, N. Y., assignors to The Sperry Corporation, a corporation of Delaware Application August 21, 1943, Serial No. 499,562

4 Claims. (Cl. 343—5)

The present invention is related to the art including ultra high frequency object-detecting and locating systems and is more specifically directed to systems of the type wherein an ultra high frequency wave is radiated toward an object to be located, and the reflected energy is received and used to supply the desired indications. The present application forms a continuation-in-part of prior copending application Serial No. 426,986, filed January 16, 1942, in the names of William W. Hansen, Russell H. Varian, John R. Woodyard, and Edward L. Ginzton and which matured into Patent No. 2,468,751 on May 3, 1949.

In systems of the present type difficulty has been experienced in securing stable reception, since the transmitting frequency may vary or drift considerably during operation for any of a number of causes, such as change in supply voltage, thermal drift, vibration, and other effects. To receive signals from a transmitter whose frequency thus tends to drift, it was formerly necessary to employ a receiver having a wide frequency band width to allow for drift. Such receivers are subject to the disadvantage of resulting unfavorable signal-to-noise ratio due to the increased band width. A further disadvantage resides in the greater number of amplification stages required, since the gain per stage decreases with increasing band width. In superheterodyne receivers further disadvantage resides in the necessity for using a local oscillator, which may also be subject to drift from similar causes.

To overcome these defects, in the present system a wave is derived differing in frequency from the transmitted frequency by a fixed and predetermined amount. This wave is then utilized as a local oscillator signal in a superheterodyne receiver so that the resulting intermediate frequency will be fixed and predetermined no matter what variation in transmitter frequency occurs. In this manner the transmitter frequency and local oscillator frequency are continuously maintained in the correct relation with one another, avoiding the above-enumerated difficulties of the prior art and permitting the use of relatively sharply tuned intermediate frequency circuits resulting in greatly improved operation.

According to the present invention, a number of ways of obtaining the local oscillator wave are disclosed. In one aspect of the invention, the local oscillator wave is derived from an amplifier of the velocity modulation type which is excited by the transmitted wave and which is modulated at a frequency equal to the desired intermediate frequency of the receiving system or a submultiple thereof. As a result of this modulation, the electron beam of the amplifier contains components of frequencies corresponding to the modulation side bands of the transmitted wave modulated by this modulating frequency. Energy at any one of these side frequencies, suitable for use as the local oscillator wave, may then be derived from the amplifier by tuning the extracting circuit to this frequency. According to another feature of the present invention, the modulated amplifier may also serve to simultaneously amplify the transmitted wave to a level suitable for radiation. According to a further modification of the invention, two different side frequencies produced in this manner may be utilized respectively as the transmitted wave and as the local oscillator wave. In still another form of the present invention a single velocity modulation oscillator-buffer tube of the type disclosed in U. S. Patent No. 2,294,942, issued September 8, 1942, in the name of R. H. Varian et al., may be utilized to simultaneously generate a high power wave suitable for transmission and a local oscillator wave separated in frequency therefrom by the desired intermediate frequency. According to a more general aspect of our invention, two or more waves may be simultaneously or selectively generated, having desired predetermined frequency separations which are independent of the frequencies of the waves themselves. Also according to our invention frequency multiplication can be simultaneously effected while obtaining two waves of desired fixed frequency separations.

Accordingly, it is an object of the present invention to provide improved synchronized radio transmission and reception apparatus of the superheterodyne type operating at a fixed intermediate frequency independent of the transmitted or received frequency.

It is another object of the present invention to provide improved apparatus at ultra high frequencies adapted to produce two or more ultra high frequency waves having frequency separations of desired amounts, independent of variation or drift of the ultra high frequency waves.

It is a further object of the present invention to provide improved apparatus for shifting a predetermined frequency by a desired amount.

Other objects and advantages of the present invention will become apparent from the specification, taken in connection with the accompanying drawings, wherein Fig. 1 shows a schematic wiring diagram of one form of the present invention, which is also disclosed in Fig. 22 of the above-mentioned parent application Serial No. 426,986 with other features forming no part of the present invention.

Figure 1:
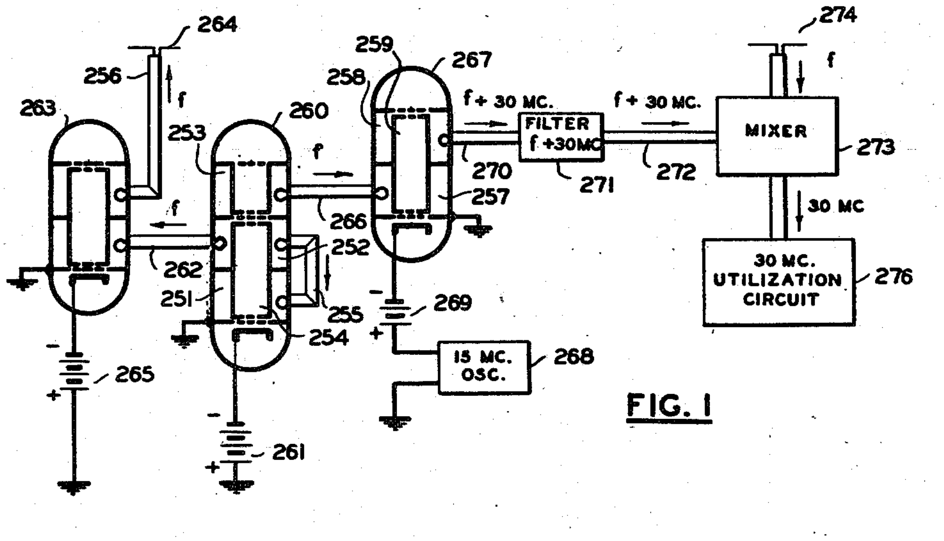

Referring to the drawings, and particularly to Fig. 1, there is shown an oscillator 260 of the velocity modulation type described more in detail in the above-mentioned Patent No. 2,294,942. In brief, oscillator 260 comprises three cavity resonators 251, 252, and 253. An electron beam is projected successively through these resonators by way of their electron-permeable walls defining gaps across which the electron beam is projected. The electrons of the beam are velocity modulated on passing through the first gap of resonator 251 by the oscillating electric field existing at this gap due to oscillations within the resonator 251. After passing through field-free drift space 254, the electrons of the beam are bunched or grouped so that they may then deliver ultra high frequency energy to resonator 252 upon passing through the corresponding gap of this resonator. Resonators 251 and 252 are both tuned to a desired frequency *f*. Some of the energy of resonator 252 is fed back to resonator 251 by means of the feed-back line 255 to sustain the system in oscillation at this frequency. Energy at the frequency *f* may then be abstracted from resonator 252 by means of the coupling line 262. As thus far described, the oscillator 260 is similar to the Klystron oscillator disclosed in U. S. Patent No. 2,242,275, granted May 20, 1941, in the name of Russell H. Varian.

The energy of frequency *f* flowing in coupling line 262 is then amplified in a power amplifier 263, also of the type disclosed in Patent No. 2,242,275, and the amplified output of amplifier 263 is supplied to a suitable radiator indicated schematically at 264 by way of a coupling line 256.

The grouped electron beam of oscillator 260 also passes across the gap of resonator 253, which is also tuned to the frequency *f*. In this way, oscillations of the frequency *f* are also excited within resonator 253, and energy at this frequency *f* may be extracted therefrom by way of the coupling line 266. Since the resonator 253 is coupled to the oscillating system of resonators 251 and 252 only by way of the electron beam, any variation in the load coupled to resonator 253, which might otherwise tend to change the resonant frequency, is ineffective to change the output frequency of oscillator 260.

Coupling line 266 supplies energy of frequency *f* to a modulating amplifier 267 of the type disclosed in Patent No. 2,281,935, issued May 5, 1942, in the name of W. W. Hansen et al. Modulator 267 includes a pair of cavity resonators 257 and 258 having respective electron-permeable gaps separated by a field-free drift space 259. An electron beam is then projected successively through one of the resonators, the drift space, and the other resonator, by means of an accelerating voltage derived from source 269. Line 266 is coupled to resonator 257, which is tuned to the frequency *f*, and thereby velocity modulates the electron beam passing through its gap. The beam then becomes bunched in the drift space 259 and delivers energy to the resonator 258.

In series with the beam-accelerating voltage source 269 is an oscillator 268 of a frequency which, as will be seen, determines the intermediate frequency of the superheterodyne receiver portion of the system. This oscillator 268 is illustrated as having a frequency of 15 megacycles per second, but may have any desired value. As discussed in Patent No. 2,281,935, oscillator 268 serves to phase modulate the grouping of the electrons of the beam so that the electron beam current represents a phase modulated wave and will have alternating components of frequency *f* and of side frequencies differing from the frequency *f* by integral multiples of the modulating frequency derived from oscillator 268.

Accordingly, the resonator 258 is tuned to the frequency *f*+15 mc., and is preferably made sufficiently sharply selective to resonate only at this frequency and not at the frequency *f* or the frequency *f*+30 megacycles. Thus an output is derived from the modulator 267 which is separated from the frequency *f* radiated from the antenna 264 by the frequency of oscillator 268. Alternatively, and preferably, as illustrated in the figure, resonator 258 is tuned to a higher order side frequency, for example, that corresponding to the second order side band, differing from the frequency *f* by 30 megacycles, or twice the frequency of oscillator 268, for reasons which will appear below.

This frequency of *f*+30 mc., may be further filtered by a filter 271 adapted to pass only this frequency. Filter 271 may assume the form of a hollow cavity resonator resonant at this frequency. Preferably, it would be formed of a resonator, one of whose higher modes of resonance is equal to this frequency *f*+30 mc., since for such a resonator the selectivity is much higher than for one oscillating at its fundamental or lowest mode. However, filter 271 may be omitted if sufficient selectivity can be obtained from resonator 258.

The wave radiated by antenna 264 will have a portion of its energy reflected from the distant object to be located, and such reflected energy may be received on a suitable receiving antenna indicated at 274. Antenna 274 is coupled to a mixer 273 of any suitable type, to which is also fed the wave of frequency *f*+30 mc. derived from amplifier 267 and serving as a local oscillator wave in the superheterodyne receiving system. The output of mixer 273 will then be the difference between the two input frequencies, or will be 30 megacycles, which represents the intermediate frequency of the system. This intermediate frequency may be utilized in any desired intermediate frequency circuit 276, one form of which is illustrated in Fig. 22 of the above-mentioned parent application Serial No. 426,986. In this way the intermediate frequency of the receiving system is entirely independent of the frequency $f$; and, in fact, if the frequency $f$ should change or drift for any reason, it will have no effect upon the intermediate frequency. Accordingly, all of the intermediate frequency circuits may be sharply and fixedly tuned to the 30-megacycle frequency in the illustration used.

It will be noted that the intermediate frequency was chosen as a multiple of (in this instance twice) the modulating frequency of oscillator 268. In this way any stray coupling between the intermediate frequency circuit 276 and oscillator 268 will be ineffective to produce any harmful results, whereas, if the modulator 267 produced an output corresponding to its first side band resulting in an intermediate frequency of 15 megacycles, harmful interaction between oscillator 268 and circuit 276 might be encountered unless special precautions in the way of isolation and shielding were used. Such special precautions are unnecessary in the system illustrated in Fig. 1 by virtue of the choice of second or higher side band for the local oscillator frequency $f+30$ mc.

Figure 2:
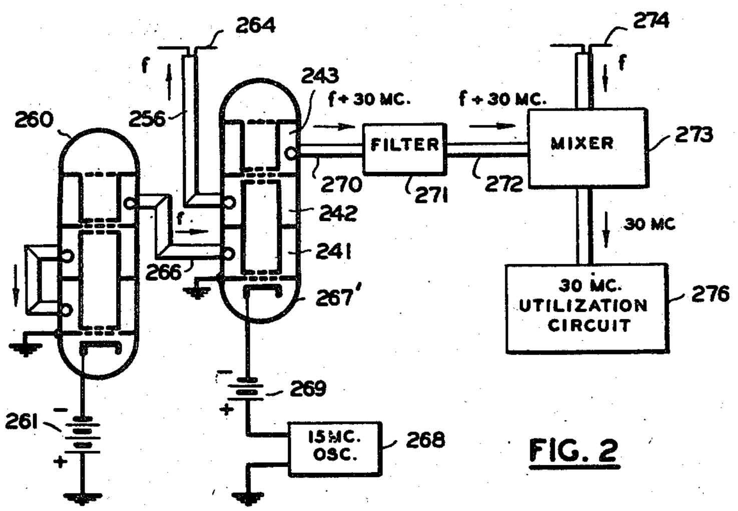
Fig. 2 shows a schematic wiring diagram of a modification of the invention in which amplification of the transmitted wave is produced in the same electron discharge device in which the side frequency or local oscillator frequency is generated.

Fig. 2 shows a modification of the system of Fig. 1. In this instance, the power amplifier 263 of Fig. 1 may be dispensed with, and the modulator 267 replaced by modulator 267'. Modulator 267' may be constructed in the same manner as the oscillator-buffer 260 or, alternatively, as the so-called cascade amplifier shown in Fig. 1 of U. S. Patent No. 2,280,824, granted April 28, 1942, to W. W. Hansen et al. Modulator 267' here consists of three resonators 241, 242 and 243, through which an electron beam is successively passed by means of accelerating battery 269. Resonators 241 and 242 are tuned to the frequency $f$ and act a a simple velocity modulation amplifier of the type disclosed in Patent No. 2,242,275. Energy of frequency $f$ derived from oscillator 260 is supplied to resonator 241 by means of coupling line 266, as in Fig. 1. In this way the electron beam passing through the resonator 241 is velocity modulated and is bunched or grouped in the succeeding drift space so that corresponding energy of frequency $f$ is delivered to resonator 242, which then excites the transmitting antenna 264 by way of the transmission line 256. If desired or necessary, a filter passing frequency $f$ may be inserted in line 256. The electron beam of modulator 267' is phase modulated by the oscillator 268 in the same manner as in Fig. 1, so that by tuning the third resonator 243 to one of the side frequencies differing from frequency $f$ by any desired integral multiple of the frequency of oscillator 268, a local oscillator wave illustrated as having the value $f+30$ mc. is again derived, and is utilized in the same manner as in Fig. 1. Filter 271 may again be omitted where desirable.

Figures 3, 4, 5:
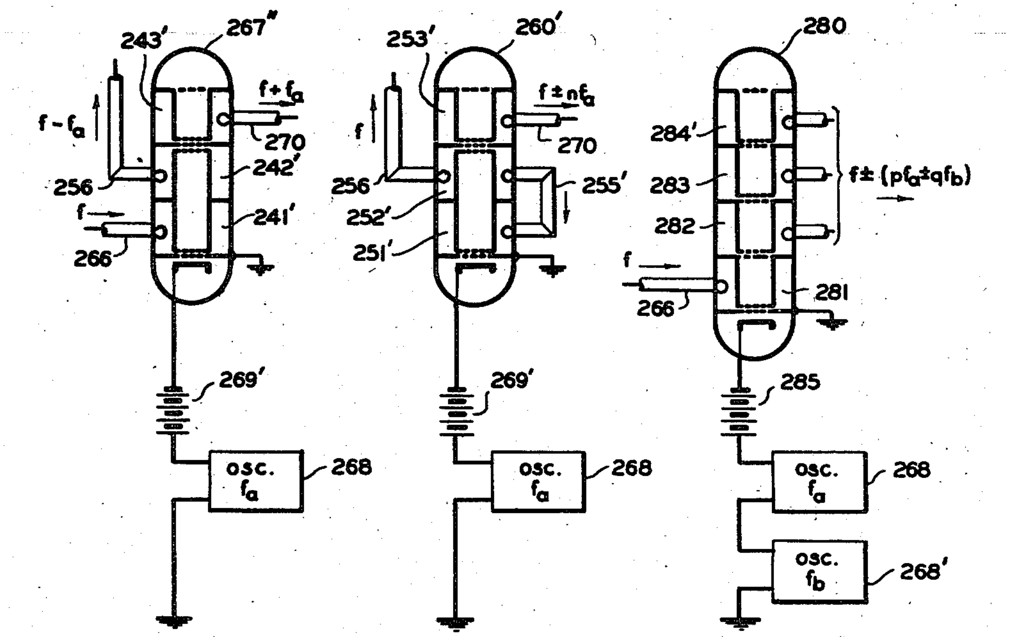
Fig. 3 shows a schematic wiring diagram of still another form of our invention, in which two different side frequencies are utilized for the transmitted wave and the local oscillator wave of the system.
Fig. 4 shows a schematic wiring diagram of a preferred embodiment of the present invention in which only a single electron discharge device is required for producing both the transmitted wave and the local oscillator wave of the system.
Fig. 5 shows a schematic wiring diagram of a further embodiment of the invention, in which a plurality of frequencies may be simultaneously produced having any of a large number of desired frequency separations.

Fig. 3 shows a modification of a portion of Fig. 2. Thus, in Fig. 3 the first resonator 241' of the modulating amplifier 267'' is again tuned to the frequency $f$ and excited at this frequency from transmission line 266 in the same manner as in Fig. 2. The second resonator 242', however, is now tuned to a lower side frequency, such as the first lower side band having frequency $f-f_a$, where $f_a$ is the frequency of the modulating oscillator 268, which may, in general, have any desired value depending on the desired intermediate frequency or the desired frequency separation between the waves to be produced. The third resonator 243' is now tuned to the first upper side band having frequency $f+f_a$. Accordingly, once more two frequencies are produced having a frequency separation of twice the modulating frequency of oscillator 268. This frequency might be 15 megacycles as in Figs. 1 and 2 or any other desired value. One of the two ultra high frequency waves thus produced is then used as the transmitted wave, and the other as the local oscillator wave.

Fig. 4 shows still another embodiment of the invention which has the advantage of extreme simplicity, since only a single microwave electron discharge device is required. Thus, a device 260' of the same type as the oscillator-buffer 260 of Fig. 1 is utilized. The first and second resonators 251' and 252' of oscillator modulator 260' are tuned to the transmitter frequency $f$ and coupled by the coupling loop 255'. Accordingly, this portion of the apparatus will act as a simple oscillator of the type shown in Patent No. 2,242,275 and will produce ultra high frequency energy of the frequency $f$ in resonator 252'. This energy may then be abstracted by a suitable coupling 256 and supplied to an antenna 264 or to any other load circuit.

The electron beam of oscillator modulator 260' is similarly modulated by the modulating frequency $f_a$ of oscillator 268 connected in series with the accelerating battery 269'. Accordingly, by tuning the third resonator 253' to one of the side frequencies of the resulting modulated wave, an output may be derived from coupling 270 having a frequency separation, with respect to the wave in line 256, equal to an integral multiple of the modulating frequency $f_a$, this multiple corresponding to the order of the side frequency to which resonator 253' is tuned. Here again resonator 253' should be sufficiently selective so as to discriminate against neighboring but undesired modulation components. If necessary or desirable, auxiliary filtering apparatus may be utilized as in Figs. 1 and 2.

Fig. 5 illustrates still another form of the present invention which has been devised to provide a greatly increased number of output frequencies having predetermined frequency separations. In this system there is provided an electron discharge device 280 of the cascade amplifier type shown in the above-mentioned Patent No. 2,280,824 and comprising a plurality of resonators such as 281, 282, 283 and 284, illustrated as four in number, although any suitable number may be utilized.

Energy of the frequency $f$ is supplied to the buncher resonator 281 which is tuned to this frequency. The electron beam projected successively through the resonators 281, 282, 283 and 284 by battery 285 is also acted upon by the frequency $f_a$ derived from oscillator 268. Accordingly, by tuning the resonators 282, 283, 284 to different side frequencies, a plurality of output frequencies will be produced having frequency separations which are integral multiples of the frequency $f_a$. It will be apparent that any number of output resonators 282, 283, 284 may be utilized corresponding to the desired number of different output frequencies.

To produce a greatly extended number of such output frequencies, the electron beam of the device is additionally modulated by a second frequency $f_b$, by means of an oscillator 268' connected in series with oscillator 268 and battery 285. Preferably, the frequency $f_b$ is widely different from frequency $f_a$. For example, frequency $f_a$ may be 15 megacycles per second, and the frequency $f_b$ may be 150 megacycles per second. Accordingly, by properly tuning the output resonators 282, 283, 284, frequencies may be produced which differ from frequency $f$ by a multiple of the frequency $f_b$. Also, frequencies will be produced which differ from the frequency $f$ by some combination of multiples of the frequencies $f_a$ and $f_b$ which may be termed a linear combination of these frequencies. Thus, in general, frequencies can be produced, by suitable tuning of the output resonators, which have any of the values given by $f\pm(pf_a\pm qf_b)$, where $p$ and $q$ are integers having any value from zero upward. Normally those frequencies for which $p$ and $q$ have low integral values will be produced with greatest amplitude. However, by suitably adjusting the voltages derived from modulating frequency oscillators 268 and 268', any one output frequency may be maximized as to amplitude or, if desired, may be completely suppressed from the electron beam, so as to avoid interaction with other, for example, neighboring frequencies which are desired. The same adjustment may be made in any of the modifications of the invention presently disclosed.

In Fig. 5, the device may be made self-excited in the same manner as in Fig. 4, by removing the input line 266 and coupling resonators 281 and 282, which are then tuned to the same frequency $f$. The remaining resonators may then be tuned to any of the resulting side frequencies $f\pm(pf_a\pm qf_b)$, as desired.

It will be clear that the device of Fig. 5 need not be restricted to only two modulating frequencies, since any desired number of such frequencies may be used, in which case the frequency separations produced will be linear combinations of all these frequencies, including multiples of the individual modulating frequencies.

Figures 6, 7, 8, 9:
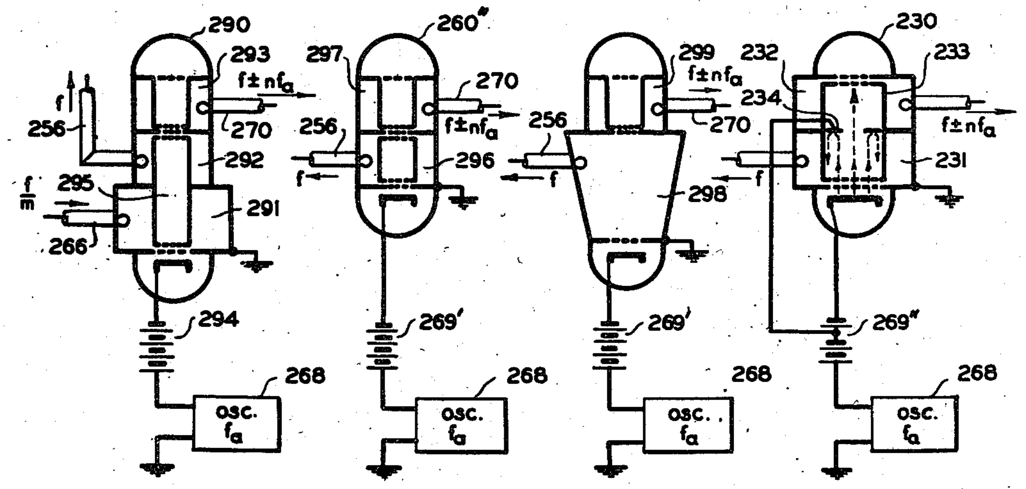
Fig. 6 shows a schematic wiring diagram of still another form of the present invention wherein frequency multiplication is produced in the same device producing the two output frequencies.
Figs. 7, 8 and 9 show schematic wiring diagrams of further modifications of the device of Fig. 4.

Fig. 6 shows still another modification of Fig. 2, in which the driving oscillator 260 may be of a much lower frequency. Thus in Fig. 6 the modulator 290 also includes a frequency multiplier. The modulator 290 comprises three resonators, 291, 292 and 293, through which an electron beam is successively passed by means of the accelerating battery 294 and cathode. Resonator 291 is tuned to be resonant at a frequency $$\frac{f}{m}$$

where $m$ is any integer, while resonator 292 is resonant at the frequency $f$ and resonator 293 is resonant at the frequency $f\pm nf_a$, where $n$ and $m$ are any desired integers. Oscillator 260 connected to line 266 then supplies frequency $$\frac{f}{m}$$

to resonator 291.

In this way, the electron beam passing through the gap of resonator 291 is velocity modulated at the frequency $$\frac{f}{m}$$

As is discussed more in detail in the above-mentioned Patent No. 2,281,935, the bunched electron beam produced by passage of this velocity modulated beam through the drift space 295 will contain a high percentage of harmonic frequency energy, so that by tuning resonator 292 to the harmonic frequency $f$ of the input frequency $$\frac{f}{m}$$

high frequency energy of this frequency $f$ may be derived and utilized in the manner shown in the preceding figures.

The bunching of the electron beam is again phase modulated by the modulating oscillator 268 of frequency $f_a$ connected in series with the accelerating voltage source 294 of the device. In this way, by tuning resonator 293 to a desired side frequency $f\pm nf_a$ of the frequency $f$ modulated by the frequency $f_a$, the second output frequency may be derived, having the desired fixed frequency separation with respect to the frequency $f$.

It is to be noted that the resonator 293 may also be tuned to any of the frequencies defined by $$k\left(\frac{f}{m}\pm nf_a\right)$$

where $k$ is any integer, since the resonator 292 might be tuned to extract one harmonic of the input while resonator 293 can be tuned to extract energy of a side frequency of a different harmonic of the input frequency. In this way more widely differing output frequencies can be derived, since as a general rule the frequency $$\frac{f}{m}$$

will be much larger than the frequency $f_a$.

Fig. 7 illustrates a modification of Fig. 4, and shows another self-excited device for producing both the desired output frequencies. In this instance the modulator-oscillator 260'' is provided with a single cavity resonator 296 having a pair of electron permeable gaps, one at each end, through which the electron beam produced by the cathode and accelerating battery 269 is projected in succession. Resonator 296 is tuned to the frequency $f$ and, in the manner discussed in U. S. Patent No. 2,259,690, granted October 21, 1941, to W. W. Hansen et al., oscillations of this frequency $f$ will be generated upon proper choice of the accelerating voltage. Energy of this frequency $f$ is taken out by line 256.

The electron beam is once more frequency or phase modulated by the modulating oscillator 268 connected in series with the accelerating voltage source 269' so that side frequency components are produced in the beam. A desired one of these side frequency components can then be extracted by the resonator 297, through which this phase modulated beam passes, when the resonator 297 is tuned to this frequency. Energy of this side frequency is taken out by line 270. In this way, the two desired fixedly separated frequencies can be derived.

Fig. 8 shows still another form of the present invention, similar to that of Figs. 4 and 7, but in which the oscillator portion of the device is replaced by a device of the "Monotron" type shown in U. S. Patent No. 2,269,456, granted January 13, 1942, to Hansen et al. Here sustained ultra high frequency oscillations of frequency $f$ are produced in the resonator 298, tuned to this frequency which forms a Monotron oscillator of the type discussed in this Patent No. 2,269,456. These oscillations may be extracted by the output line 256.

The electron beam exciting from the oscillator section formed by resonator 298 is bunched in accordance with the frequency $f$, as in the other forms of the invention, and may be phase or frequency modulated by the oscillator 268 connected in series with accelerating voltage source 269'. Output resonator 299 may then be tuned to any one of the side frequencies $f \pm nf_a$ of the resulting modulated wave, and energy of this selected side frequency may be extracted from the device by a coupling line 270.

Fig. 9 shows still another embodiment of the present invention, also having a self-excited oscillator section for producing the frequency $f$ and a buffer section for producing the frequency $f \pm nf_a$. Thus, in Fig. 9 the oscillator-modulator 230 is provided with a pair of resonators 231 and 232. An electron beam is projected through the gap of resonator 231 which is tuned to the frequency $f$. Interposed in the drift space 233 is an electrode 234 shown as being in the form of a flat ring with a large central aperture. Electrode 234 is maintained at a potential only slightly different from that of the cathode, and may be either positive or negative with respect to the cathode, although illustrated as at a slight positive potential. Since the resonators are grounded as illustrated in the drawing, electrode 234 supplies a retarding field which reverses the outermost portions of the electron beam and causes them to reenter the resonator 231. As is described with respect to Fig. 2 of Patent No. 2,250,511, granted July 29, 1941, to R. H. Varian et al., self-sustained oscillations of the frequency $f$ will then be excited in the resonator 231 upon proper adjustment of the potentials upon the cathode and reflector electrode 234.

Reflector electrode 234 is provided with a large central opening, so that a portion of the electron beam, which is velocity modulated upon the first traversal through resonator 231, will not be reflected by the electrode 234 but will pass directly onward through resonator 232. Modulating oscillator 268 of frequency $f_a$ is again connected in series with the accelerating battery 269'', and modulates this electron beam. Accordingly, by tuning resonator 232 to a desired side frequency $f \pm nf_a$, an output at this side frequency may be derived in a manner similar to that of the preceding figures.

In any of the electron discharge devices of Figs. 7, 8 or 9, the output resonator 297, 299, or 232 may also be tuned to the frequency $f$, whereupon variations in load conditions cannot react upon the oscillator section because only electron coupling exists between the oscillator section and the output resonator, serving then as a buffer resonator.

In any of the modifications of the invention, the output resonators need not be tuned to a fixed frequency, but may be provided with frequency adjusting means of any well known type, so that they may be selectively tuned to any of a number of the side frequencies produced. In this way, a single modulator may produce any of a number of local oscillator waves, or any of a number of frequency separations, or provide any of a number of frequency shifts.

It will be clear also, that a plurality of modulating frequencies may be used with any of the modifications of the invention, and that a plurality of output resonators tuned to different side frequencies may also be used to derive several output frequencies simultaneously with any of these modifications.

Although the modulators of the present invention have been illustrated as operating by varying the accelerating voltage, any other forms of modulation may be used to produce the desired side frequencies. Thus the electron beam current may be varied at the modulating frequency independently of or in conjunction with variation in the accelerating voltage as by impressing the modulating voltage upon a control grid between the cathode and first resonator. Alternatively, the transit time of the electrons may be varied, in any of the ways shown in Patent No. 2,281,935. It is to be understood that any forms of amplitude, frequency or phase modulation, or any combination thereof, may be used, including any of those shown in above Patent No. 2,281,935.

It will be noted that in any of the above modifications the output resonator of the modulator unit, such as 258 of Fig. 1, 243 of Fig. 2, 242' or 243' of Fig. 3, 253' of Fig. 4, 282, 283 or 284 of Fig. 5, 293 of Fig. 6, 297 of Fig. 7, 299 of Fig. 8, and 232 of Fig. 9, may be tuned to a side frequency of a harmonic of the frequency $f$, and energy of this frequency $kf \pm mf_a$, where $k$ and $m$ are any integers, may then be derived. This will be seen from the consideration that the grouped electron beam produced by this velocity modulation process contains a high percentage of harmonic frequency energy, as discussed in Patent No. 2,281,935. This harmonic energy is also modulated by the modulating frequency $f_a$ of oscillator 268, and accordingly any of the side frequencies corresponding to this harmonic energy may be extracted from the electron beam by suitable tuning of any of these output resonators.

It will be seen that although the above modifications of the present invention were directed toward a radio locating system having a transmitter and a superheterodyne receiver for receiving reflected energy, in its broader aspect the present invention is concerned with the production of ultra high frequencies with predetermined and fixed frequency separations which are independent of variations in the ultra high frequencies; that is, a plurality of frequencies are produced which "track" with one another. Also, the invention may be used as a frequency shifter or converter.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A high frequency system comprising a source of ultra high frequency energy of predetermined frequency, means for radiating energy of said predetermined frequency; an electron-discharge device comprising means for producing an electron stream bunched in accordance with said predetermined frequency, means for controlling said bunched stream at a modulating frequency, and means for extracting ultra high frequency energy from said stream differing in frequency from said predetermined frequency by an integral multiple of said modulating frequency, said last means including a tuned circuit directly excited by said electron stream and tuned to said different frequency; means for receiving a portion of said radiated energy, and means for mixing said received energy and said extracted energy to produce an intermediate frequency equal to said integral multiple of said modulating frequency and independent of variation in said predetermined frequency.

2. An ultra high frequency system comprising a source of ultra high frequency energy of predetermined frequency; an electron-discharge device comprising means for producing an electron stream grouped in accordance with said predetermined frequency, means for controlling said electron stream grouping in accordance with a modulating frequency, and means for extracting energy of said predetermined frequency from said stream, means for radiating said extracted energy, further means for extracting energy from said stream of a frequency differing from said predetermined frequency by an integral multiple of said modulating frequency, said last means including a tuned circuit directly excited by said electron stream and tuned to said different frequency; means for receiving a portion of said radiated energy, and means for mixing said received energy and said different-frequency energy to produce an intermediate frequency of said integral multiple of said modulating frequency and independent of variation of said predetermined frequency.

3. Ultra high frequency electron discharge apparatus, comprising means for producing an electron stream bunched in accordance with an ultra high frequency wave of predetermined frequency, means for modulating the bunching of said beam at a modulating frequency, means for extracting energy from said stream at a plurality of frequencies corresponding to side frequencies of said modulation process, said last named means comprising respective circuits tuned substantially to said side frequencies, means for radiating energy at one of said side frequencies, means for receiving a portion of said radiated energy, and means for mixing said received energy and energy at another of said side frequencies to produce an intermediate frequency which is an integral multiple of said modulating frequency and independent of variation of said predetermined frequency.

4. Ultra high frequency apparatus, comprising means for producing an electron stream grouped in accordance with a predetermined ultra high frequency, means for modulating said grouped stream in accordance with a plurality of modulating frequencies, means for extracting energy from said electron stream at a plurality of points therealong at a plurality of frequencies, each differing from said predetermined frequency by a linear combination of said modulating frequencies, means for radiating energy at one of said plurality of frequencies, means for receiving a portion of said radiated energy, and means for mixing said received energy with energy at another of said plurality of frequencies, whereby an intermediate frequency is produced of a value equal to a linear combination of said modulating frequencies and independent of variation of said predetermined frequency.

WILLIAM W. HANSEN.
JOHN R. WOODYARD.

REFERENCES CITED

The following references are of record in the file of this patent:

UNITED STATES PATENTS

| Number | Name | Date |
|---|---|---|
| Re. 21,955 | Chaffee | Nov. 25, 1941 |
| 1,993,395 | Beers | Mar. 5, 1935 |
| 2,143,864 | Conklin et al. | Jan. 17, 1939 |
| 2,189,549 | Hershberger | Feb. 6, 1940 |
| 2,242,275 | Varian | May 20, 1941 |
| 2,268,643 | Crosby | Jan. 6, 1942 |
| 2,280,824 | Hansen et al. | Apr. 28, 1942 |
| 2,281,935 | Hansen et al. | May 5, 1942 |
| 2,294,942 | Varian et al. | Sept. 8, 1942 |